United States Patent [19]

Ruff et al.

[11] 4,370,527

[45] Jan. 25, 1983

[54] ARRANGEMENT FOR FEEDING A SUBSCRIBER DEVICE

[75] Inventors: Günter W. Ruff, Auenwald; Hartmut Scheffler, Aspach, both of Fed. Rep. of Germany

[73] Assignee: Licentia Patent-Verwaltungs-GmbH, Frankfurt am Main, Fed. Rep. of Germany

[21] Appl. No.: 239,103

[22] Filed: Feb. 27, 1981

[30] Foreign Application Priority Data

Feb. 28, 1980 [DE] Fed. Rep. of Germany ....... 3007549

[51] Int. Cl.³ .......................................... H04M 19/00
[52] U.S. Cl. ..................................... 179/70; 179/77; 179/18 FA
[58] Field of Search ............ 179/70, 77, 18 F, 18 FA, 179/16 AA, 16 F, 81 R

[56] References Cited

U.S. PATENT DOCUMENTS

| 3,035,122 | 5/1962 | Livingstone | 179/18 FA |
| 3,562,561 | 2/1971 | Klosterman | 179/70 |
| 3,649,769 | 3/1972 | Pest | 179/77 |
| 3,800,095 | 3/1974 | Cowpland | 179/77 |
| 4,197,425 | 4/1980 | Secrett et al. | 179/77 |

Primary Examiner—Gerald L. Brigance
Attorney, Agent, or Firm—Spencer & Kaye

[57] ABSTRACT

In a circuit for supplying operating power from a power supply at a central office to a telephone device at a subscriber location via a two-wire line, and including a switching unit at the subscriber location actuatable to connect the telephone device to the power supply to place the device into operation, there are further provided a first switching device connected between the power supply and the line for controlling the supply of power to the line, and a second switching device connected between the line and the telephone device for controlling the delivery of power from the line to the telephone device, with each switching device being connected to respond to the traversing of a threshold by a parameter of the power from the power supply.

14 Claims, 2 Drawing Figures

— 4,370,527 —

ARRANGEMENT FOR FEEDING A SUBSCRIBER DEVICE

BACKGROUND OF THE INVENTION

The present invention relates to an arrangement for supplying power to a subscriber telephone from a central office power supply via a two-wire line connecting the central office to the telephone, the power supply circuit to the telephone being closed by actuating a switching means in the telephone set when there is an incoming or outgoing call.

Such subscriber feeder arrangements are known and are used in analog telephone exchange systems. A digital local network or a digital subscriber connection, however, requires the transfer of complex electronic functions from the central office to the subscriber. Many of these shifted electronic functions must be performed at a time when the user has not yet lifted the telephone handset for receiving an incoming call. In any case, to perform these functions, a power supply is necessary.

It has therefore been proposed to modify the conventional subscriber power supply arrangements in such a manner that power is continuously fed from the central office power supply independently of the operating state of the subscriber device. But this has the drawback of producing high current consumption.

It has therefore also been proposed to effect feeding of power at the subscriber's end from the power mains at the subscriber location, and thus to burden the subscriber with power supply and current drain. However, this has the drawbacks of, firstly, high installation costs and, secondly, loss of telephone service due to power failures.

SUMMARY OF THE INVENTION

It is therefore an object of the present invention to provide a subscriber supply arrangement of the above-mentioned type in which, without high costs, feeding of power is possible independently of the operating state of the subscriber device and wherein minimal current is consumed when the device is not in use.

The above and other objects are achieved, according to the invention, in a circuit for supplying power to a subscriber telephone device connected to a central office via a two-wire line, and including switching means at the subscriber location actuatable to connect the telephone device to the power supply to place the device into operation, by the provision of a first switching device connected between the power supply and the line for controlling the supply of power to the line, and a second switching device connected between the line and the telephone device for controlling the delivery of power from the line to the telephone device, with each switching device being connected to respond to the traversing of a threshold by a parameter of the power from the power supply.

The present invention results in the advantages that supply of power is possible, as before, from the central office, that this supplying can also take place after a connection has been terminated, and that nevertheless a significant current consumption is avoided when the subscriber device is not in use.

It is a further advantage that with the solution according to the invention, no separate auxiliary voltage supply is required.

DESCRIPTION OF THE PREFERRED EMBODIMENTS

Figure 1:
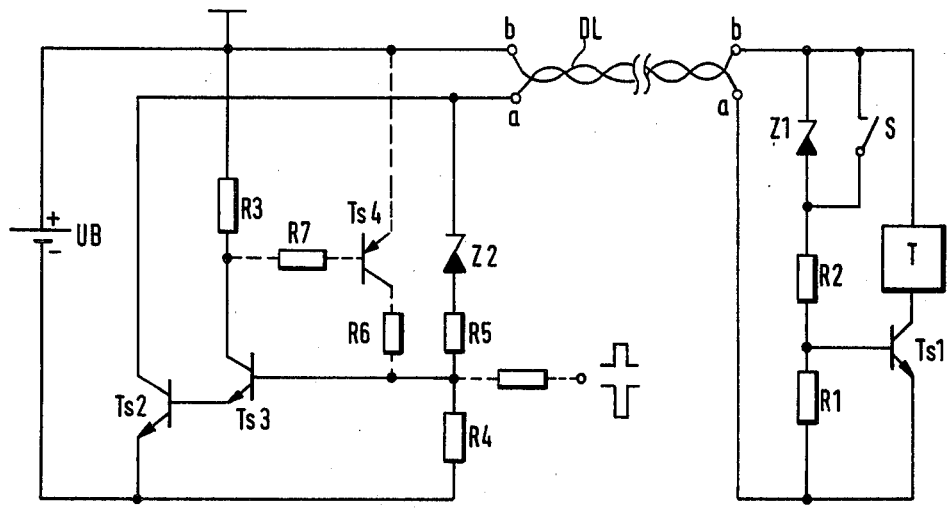
FIGS. 1 and 2 are circuit diagrams of two preferred embodiments of telephone power supply systems according to the invention.

FIG. 1 depicts a particularly advantageous embodiment of the invention in which, in the central office VSt, a first switching device is disposed between the central office power supply UB, here shown as a battery, and a two-wire line DL composed of two wires, or conductors a and b and, at the location of the subscriber Tln, a second switching device is included between the line DL and the subscriber's telephone device T to be supplied with power.

The first switching device, in the central office, includes a switching transistor Ts2 with which the negative pole of the central office power supply UB can be disconnected from one conductor, a, while the positive pole of the power supply is permanently connected with the other conductor, b. The switching transistor Ts2 can be actuated by a signal applied to its base via a further switching transistor Ts3 whose collector is connected with the positive pole of the central power supply via a resistor R3. The base-electrode of the further switching transistor Ts3 is connected with the negative pole of the central power supply via a resistor R4 and with the conductor a via a resistor R5 and a zener diode Z2.

At the subscriber's end, the second switching device includes a first zener diode Z1, a resistor R1 and a resistor R2, all of which are connected in series between the conductors a and b. The base-emitter path of a switching transistor Ts1 is connected in parallel with the resistor R1. The emitter electrode of the switching transistor Ts1 is connected to conductor a and its collector is connected to the other line b via the subscriber telephone instrument T to be supplied with power. A switch S is connected in parallel with the zener diode Z1.

No current flows to subscriber location Tln when instrument T is not in use since both zener diodes have a characteristic such that they are blocking. If the switch S at the subscriber's end is actuated, thus short-circuiting the zener diode Z1, a circuit is closed, i.e. via the positive pole of the central power supply UB, the conductor b, switch S, resistors R2 and R1, conductor a, zener diode Z2, resistors R5 and R4 and the negative pole of the central power supply UB, it being assumed that the breakdown voltage of the zener diode Z2 is equal to or less than the minimum value of the supply voltage provided by supply UB.

At the central office VSt the switching transistor Ts3 then becomes conductive due to the voltage drop across resistor R4 and thus the switching transistor Ts2 becomes conductive as well so that the negative pole of the central power supply is effectively connected to the conductor a.

Feeding of power to the subscriber device T is effected in that the transistor switch Ts1 is actuated, by the voltage drop then appearing across resistor R1, to be conductive. The power supply circuit at the subscriber's end is then maintained via the zener diode Z1 whose breakdown voltage is selected to be less than or equal to the minimum occurring supply voltage across the terminals of the line DL at the subscriber's end when switch S is open.

At the central office VSt the request for a connection from the subscriber is recorded and the connection of the power supply by way of switching transistor Ts2 remains in effect, for example by the action of a further switching transistor Ts4 whose emitter electrode is connected with the positive pole of the power supply and whose collector furnishes, via a resistor R6, the necessary base actuation current for the transistor Ts3. The base electrode of transistor Ts4 is actuated via a resistor R7 by the potential at the collector of transistor Ts3. In this way the power supply connection is maintained.

When the connection is terminated, the power supply circuit is disconnected in that, for example, an externally generated negative pulse is applied to the base electrode of the switching transistor Ts3 so that all switching transistors and zener diodes return to their blocking, or nonconductive, state.

For an incoming call, the power supply circuit is switched in by a positive pulse to the base electrode of the switching transistor Ts3 thus causing the switching transistor Ts2 to connect the central battery to the double line while the switching transistor Ts4 maintains the actuation of transistor Ts3, as described above and, at the subscriber's end, the switching transistor Ts1 is actuated via the zener diode Z1 so that the subscriber device T is again connected to the feeder circuit.

Figure 2:
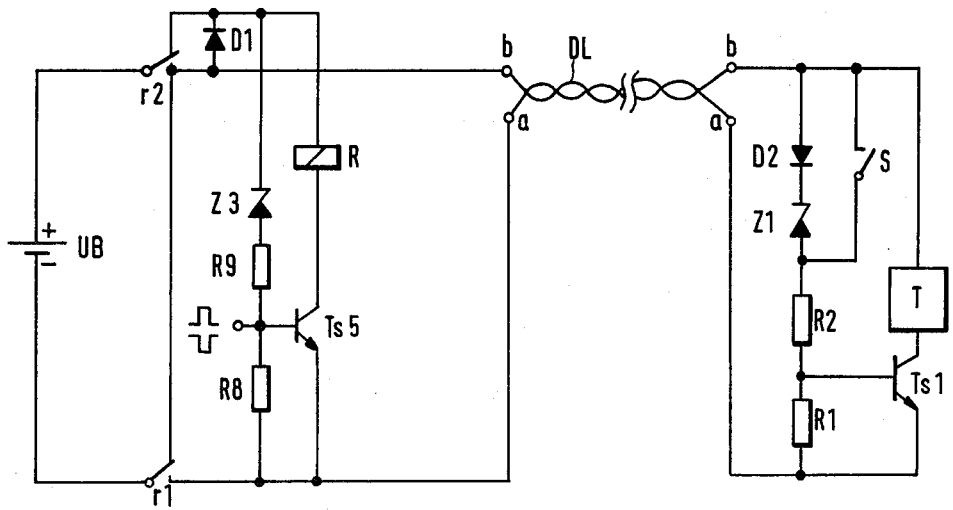

FIG. 2 shows another embodiment of the invention in which the central office power supply, when the subscriber's telephone is not in use, is connected to the line DL with its polarity reversed. This is done by means of relay switching contacts r1 and r2, respectively. When contacts r1 and r2 are in the positions shown, the switching device at the central office, which here includes a series connection of a zener diode Z3 and two resistors R8 and R9, is connected between the conductor a and the positive pole of the central office power supply while the negative pole of the supply is connected to the other conductor b. The base emitter path of a switching transistor Ts5 is connected in parallel with the resistor R8, the emitter of transistor Ts5 is connected to the conductor a and its collector is connected via the relay coil R for controlling contacts r1 and r2 to the cathode of the zener diode Z3.

The second switching device at the subscriber location corresponds to that of FIG. 1, with an additional diode D2 being inserted between the conductor b and the zener diode Z1. No current flows when telephone T is not in use since then the zener diode Z1 as well as the zener diode Z3 are blocked.

If a user wishes to establish a connection, switch S is closed. This causes the series connection of the diode D2 and the zener diode Z1 to be short-circuited and thus closes a circuit which extends from the positive pole of the central office power supply, through the second switching contact r2, the zener diode Z3, resistors R9 and R8, conductor a, resistors R1 and R2, switch S, conductor b, first switching contact r1, to the negative pole of the central office power supply, since now the supply voltage from the central office power supply across zener diode Z3 exceeds the breakdown voltage of that diode. This causes the transistor Ts5 to become conductive and relay coil R to be energized so that contacts r1 and r2 are switched and the full power supply voltage is applied via the switching contacts across line DL. Thereafter, relay coil R continues to be energized and transistor Ts5 is maintained conductive by both being supplied with actuating current via the second switching contact r2 and the diode D1 which connects the conductor b with the cathode of the zener diode Z3.

At the subscriber location, the subscriber device T is connected to the power supply voltage via transistor Ts1, as described in connection with FIG. 1. Once a connection is terminated, a negative pulse is applied to the base electrode of transistor Ts5, causing the latter to become nonconductive, relay R to return to its deenergized position and the connection of the first switching device to switch so that the device is again connected in series between the conductor a and the positive pole of the central office power supply. At the subscriber location, switching transistor Ts1 is blocked. Since the diode D2 is now also connected in the blocking direction, no inverse forward current can flow through the zener diode Z1 and the circuit is open. To avoid possible inverse operation of the switching transistor Ts1, a diode must be connected between this transistor and the conductor b.

At the occasion of an incoming call, the first switching device, in the central office, is actuated from the central office in that, for example, a positive pulse is applied to the base electrode of the switching transistor Ts5. This causes, as described above, the central office power supply to be connected to the line DL in the correct polarization. As a result, the subscriber device T is connected to the power supply circuit at the subscriber location, also as described above, in that diode D2, zener diode Z1 and thus also the switching transistor Ts1 are actuated to be conductive.

Of course, the power supply circuit according to the invention is not limited to the disconnection or reversal of polarity respectively, of the supply voltage, but it can also be used to connect or to reverse connect the line DL to taps of the central office power supply.

It will be understood that the above description of the present invention is susceptible to various modifications, changes and adaptations, and the same are intended to be comprehended within the meaning and range of equivalents of the appended claims.

What is claimed is:

1. In a circuit for supplying operating power from a power supply at a central office to a telephone device at a subscriber location via a two-wire line, and including switching means at the subscriber location actuatable to effect connection of the telephone device to the power supply to place the device into operation, the improvement comprising: a first switching device connected between said power supply and said line for controlling the supply of power to said line; and a second switching device connected between said line and said telephone device for controlling the delivery of power from said line to said telephone device, with each said switching device being connected to switch in response to the traversing of a threshold by the voltage or the current which is on the two-wire line and which is caused by said power supply.

2. An arrangement as defined in claim 1 wherein said first switching device is connected to switch in response to the closing of said switching means in a manner to effect a galvanic conductive connection of said power supply across said line.

3. An arrangement as defined in claim 1 or 2 wherein said power supply has output terminals supplying a selected voltage and said first switching device is switchable between a first state in which the selected voltage is applied between the wires of said line, and a second state in which the selected voltage is disconnected from said line.

4. An arrangement as defined in claim 3 further comprising further switching means connected for selectively switching said first switching device between said first and second states when said telephone device is not in use.

5. An arrangement as defined in claim 4 wherein said second switching device is connected to switch in response to the switching of said first switching device between said first and second states for connecting said telephone device between said line wires when said first switching device is in said first state and for disconnecting said telephone device from said line wires when said first switching device is in said second state.

6. An arrangement as defined in claim 1 wherein said second switching device comprises: a first switching transistor having its emitter-collector path connected to said telephone device to form therewith a series path connected between said line wires; and a first series circuit composed of a first zener diode and a first resistor connected between one said line wire and the base of said transistor for supplying a signal to control the switching state of said transistor, and said switching means are connected in parallel with said zener diode.

7. An arrangement as defined in claim 6 wherein said first switching device comprises a second switching transistor having its collector-emitter path connected between one said line wire and one output terminal of said power supply, and control signal producing means connected between the base electrode of said second transistor and said one wire.

8. An arrangement as defined in claim 7 wherein said control signal producing means comprises a second series circuit composed of a second zener diode and a second resistor.

9. An arrangement as defined in claim 8 wherein said control signal producing means further comprise a third switching transistor having its base-emitter path connected as part of said second series circuit, and its collector connected via a third resistor to the other output terminal of said power supply.

10. An arrangement as defined in claim 9 further comprising a fourth switching transistor and fourth and fifth resistors, with said fourth resistor and the collector-emitter path of said fourth transistor being connected together in series between the base of said third transistor and the other output terminal of said power supply for controlling the switching state of said third transistor, and said fifth resistor being connected between the base of said fourth transistor and the collector-emitter path of said third transistor for controlling the switching state of said fourth transistor.

11. An arrangement as defined in claim 1 wherein said first switching device comprises: a relay having an energizing coil and two movable contacts each permanently connected to a respective output terminal of said power supply; first conduction means associated with one said movable contact for permitting said one contact to selectively connect its associated power supply terminal to one or the other wire of said line, depending on the actuation state of said relay; relay control means connected to said relay coil and including a switching transistor having its collector-emitter path connected in series with said relay coil, and a first diode connected in series with said emitter-collector path and said relay coil to form therewith a series branch connected between the two wires of said line, with said diode being connected at one end of said branch; and second conduction means associated with the other said movable contact for permitting said other contact to selectively connect its associated power supply terminal to one or the other side of said diode, and said second switching device comprises a first zener diode and a second diode connected together in series between said line wires.

12. An arrangement as defined in claim 11 wherein said relay control means further comprise a second zener diode and a resistor connected together in series between the base electrode of said transistor and one wire of said line.

13. An arrangement as defined in claim 1 or 2 wherein said power supply has output terminals supplying a selected voltage and said first switching device is switchable between a first state in which the selected voltage is applied between the wires of said line, and a second state in which the polarity of the selected voltage applied between the wires of said line is reversed.

14. An arrangement as defined in claim 13 further comprising further switching means connected for selectively switching said first switching device between said first and second states when said telephone device is not currently in use.

* * * * *